United States Patent
Melis et al.

(10) Patent No.: US 9,739,230 B2
(45) Date of Patent: Aug. 22, 2017

(54) METHOD OF OPERATING A FUEL INJECTOR

(71) Applicant: GM GLOBAL TECHNOLOGY OPERATIONS LLC, Detroit, MI (US)

(72) Inventors: Massimiliano Melis, Rivoli (IT); Francesco Pesce, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 258 days.

(21) Appl. No.: 14/623,177

(22) Filed: Feb. 16, 2015

(65) Prior Publication Data

US 2015/0233319 A1 Aug. 20, 2015

(30) Foreign Application Priority Data

Feb. 17, 2014 (GB) .................................. 1402762.7

(51) Int. Cl.
| | | |
|---|---|---|
| F02M 1/00 | (2006.01) | |
| F02D 41/38 | (2006.01) | |
| F02D 41/26 | (2006.01) | |
| F02M 51/06 | (2006.01) | |
| F02D 41/40 | (2006.01) | |

(Continued)

(52) U.S. Cl.
CPC ......... *F02D 41/3827* (2013.01); *F02D 41/20* (2013.01); *F02D 41/26* (2013.01); *F02D 41/3872* (2013.01); *F02D 41/40* (2013.01); *F02M 47/027* (2013.01); *F02M 51/061* (2013.01); *F02M 63/0225* (2013.01); *F02D 2041/389* (2013.01);

(Continued)

(58) Field of Classification Search
CPC ........ F02D 41/30; F02D 41/20; F02M 47/027
USPC ................ 123/445, 458, 472, 478, 480, 490
See application file for complete search history.

(56) References Cited

U.S. PATENT DOCUMENTS

| | | | |
|---|---|---|---|
| 6,164,264 A | 12/2000 | Thomas | |
| 6,655,654 B1 * | 12/2003 | Cotton, III | ........... F02M 47/027 239/102.1 |

(Continued)

FOREIGN PATENT DOCUMENTS

| | | |
|---|---|---|
| EP | 0524132 A2 | 1/1993 |
| EP | 1053397 B1 | 6/2004 |

(Continued)

OTHER PUBLICATIONS

UKIPO, British Search Report for Application No. 1402762.7, dated Sep. 1, 2014.

*Primary Examiner* — John Kwon
(74) *Attorney, Agent, or Firm* — Lorenz & Kopf LLP

(57) ABSTRACT

An apparatus and method for operating a fuel injector of an internal combustion engine is disclosed. A first energizing electrical current is supplied to an injector solenoid, causing the opening of an injector control volume and a pressure reduction in said injector control volume, for a first energizing time. The first energizing time is predetermined to avoid that the pressure in the injector control volume approximates a value which would cause an injector needle to raise up and a fuel injection to start. After the predetermined time interval, a second energizing electrical current is supplied to the injector solenoid for a predetermined second energizing time, which is a function of a rail pressure ($p_{rail}$) and a fuel injection quantity.

11 Claims, 4 Drawing Sheets

(51) Int. Cl.
 *F02D 41/20* (2006.01)
 *F02M 47/02* (2006.01)
 *F02M 63/02* (2006.01)

(52) U.S. Cl.
 CPC . *F02D 2200/0602* (2013.01); *F02M 2200/09* (2013.01); *Y02T 10/44* (2013.01)

(56) References Cited

U.S. PATENT DOCUMENTS

| | | |
|---|---|---|
| 7,984,706 B2 | 7/2011 | Stewart, Jr. et al. |
| 8,079,345 B2 | 12/2011 | Okamoto |
| 2004/0181760 A1* | 9/2004 | Ismailov ................ F02D 41/20 703/2 |
| 2006/0071094 A1* | 4/2006 | Ehresman ............ F02M 57/023 239/88 |
| 2008/0228374 A1* | 9/2008 | Ishizuka ............. F02D 41/3809 701/103 |
| 2010/0043753 A1* | 2/2010 | Gallagher ............. F02D 35/024 123/447 |
| 2010/0229827 A1* | 9/2010 | Ehresman .............. F02M 57/06 123/297 |
| 2010/0282211 A1 | 11/2010 | Daniel et al. |
| 2012/0035833 A1* | 2/2012 | Melis .................... F02D 41/401 701/104 |
| 2012/0080536 A1 | 4/2012 | Parrish et al. |
| 2012/0247428 A1* | 10/2012 | Grimminger ....... F02D 41/2438 123/472 |
| 2013/0239929 A1 | 9/2013 | Lehner et al. |
| 2015/0233319 A1* | 8/2015 | Melis .................... F02D 41/40 123/490 |

FOREIGN PATENT DOCUMENTS

| | | |
|---|---|---|
| EP | 1121518 B1 | 3/2013 |
| GB | 2498355 A | 7/2013 |
| WO | 0210581 A1 | 2/2002 |
| WO | 03085296 A2 | 10/2003 |

* cited by examiner

Detail X

METHOD OF OPERATING A FUEL INJECTOR

CROSS-REFERENCE TO RELATED APPLICATION

This application claims priority to British Patent Application No. 1402762.7, filed Feb. 17, 2014, which is incorporated herein by reference in its entirety.

TECHNICAL FIELD

The present disclosure relates to a method of operating a fuel injector of an internal combustion engine, in particular a fuel injector of a common rail system (CRS) utilized for Diesel engines.

BACKGROUND

It is known that modern engines are provided with a fuel injection system for directly injecting the fuel into the cylinders of the engine. The fuel injection system generally includes a fuel common rail and a plurality of electrically controlled fuel injectors, which are individually located in a respective cylinder of the engine and which are fluid and hydraulically connected to the fuel rail through dedicated injection pipes.

Each fuel injector, particularly injectors of a common rail system, generally includes an injector housing, a nozzle and a movable needle which repeatedly opens and closes this nozzle. The fuel coming from the rail and passing through the injection pipe and, inside the injector housing, a delivery channel, reaches the nozzle and can thus be injected into the cylinder giving rise to single or multi-injection patterns at each engine cycle.

The needle movement is caused by the forces acting from above and from below the needle itself. The first one is the needle closing force, the other is the needle opening force. Both are the product between a pressure and a sealing surface. When no injection is required, the needle closing force is higher than the needle opening force, thus ensuring that the injection holes are covered. On first approximation and for a predetermined injection pressure, the needle opening force can be considered as a constant. Therefore, to cause the raising up of the needle, it will be sufficient to decrease the closing force, for example, by decreasing the pressure, which acts on top of the needle. Such pressure is due to the fuel, which fills a so called injector control volume (CV). The control volume is a small volume inside the injector housing and is delimited by injector housing walls, a first calibrated hole (known as "A" hole), a second calibrated hole (known as "Z" hole) and the top surface of the injector needle. The hole Z always joins the common rail through the injection pipe to the injector control volume. The A hole is normally closed, when no fuel injection is required, otherwise it joins the injector control volume with an injector leakage line at low pressure (as a first approximation, atmospheric pressure), when the injection is performed. The control volume is fed through the Z hole and can be emptied through the A hole. When no injection is required, being the A hole closed, the pressure in the control volume is equal to the injection pressure. When the injection is required, being the A hole larger than the Z hole, it is possible to discharge the fuel from the control volume, thus reducing the pressure in the control volume itself.

The injection is operated thanks to aid of a dedicated injector solenoid and injector actuator. The injector solenoid is controlled by an electronic control unit (ECU). The ECU operates each fuel injection, by energizing the solenoid for a predetermined period of time, causing, in turn, the injector actuator to open the A hole, the fuel discharge from the control volume to the injector leakage line, the pressure decrease in the control volume, the needle to raise up and uncover the injection holes. When the energizing time is ended, the injector actuator will close the A hole and the pressure in the control volume will increase up to the injection pressure value, causing the needle to go down and cover the injection holes. The energizing time (ET) of the fuel injector is determined by the ECU as a function of a desired quantity of fuel to be injected.

Due to functional parameters of the common rail system and the engine, mainly the pressure waves propagation in the injection pipes, the fuel injection quantity, even under same actuation conditions (rail pressure and energizing time) cannot be perfectly repeatable shot to shot. Shot to shot dispersion is physically present in each injector and determine a different injected quantity between each combustion cycle. The injector shot to shot dispersion is a core parameter that indicates how precise the injector is. In order to keep the combustion stable the shot to shot dispersion has to be minimized, ensuring the higher possible precision over temperature, engine working point and combustion mode.

Therefore a need exists for a method of operating a fuel injector which does not suffer of the above inconvenience.

SUMMARY

The present disclosure provides an apparatus and method of operating a fuel injector of an internal combustion engine, that allows the reduction of the injector shot to shot dispersion. In particular the method includes supplying, a first energizing electrical current to an injector solenoid, causing the opening of an injector control volume and a pressure reduction in the injector control volume, for a first energizing time. The first energizing time is predetermined to avoid that the pressure in the injector control volume approximates a value which would cause an injector needle to raise up and a fuel injection to start. After a predetermined time interval, a second energizing electrical current is supplied to the injector solenoid for a predetermined second energizing time, which is a function of a rail pressure and a fuel injection quantity.

An apparatus is also disclosed for performing the method of operating a fuel injector of an internal combustion engine. The apparatus includes an injector solenoid operable in response to a first energizing electrical current to an injector solenoid, causing the opening of an injector control volume and a pressure reduction in said injector control volume for a first energizing time. The first energizing time is predetermined to avoid that the pressure in the injector control volume approximates a value which would cause an injector needle to raise up and a fuel injection to start. After a predetermined time interval, a second energizing electrical current is supplied to the injector solenoid, for a predetermined second energizing time, which is a function of a rail pressure and a fuel injection quantity.

An advantage of the present disclosure is that the method allows to decrease the injector shot to shot dispersion, since the method acts on the control volume pressure trying to have its value as constant as possible when the fuel injection is actuated. This is realized, by means of a short pulse of the energizing electrical current, which is placed just before the injection event to be actuated. This short pulse is not able to actuate a fuel injection but is able to stabilize the pressure of the injector control volume decreasing the shot to shot deviation of the injector itself.

According to a further embodiment, the first energizing time is a function of the rail pressure and the second energizing time. According to an aspect of this embodiment, the first energizing time is smaller than 150 μs. According to another aspect of this embodiment a maximum value of the first energizing electrical current ranges between 4 and 14 Amperes. An advantage of this embodiment is that the first energizing time, calibrated as a function of the rail pressure and the second or standard energizing time is able to stabilize the control volume pressure and, at the same time, to avoid the fuel injection. As a consequence, the maximum value of the first energizing electrical current can range between the above prescribed values.

According to a further embodiment the time interval is a function of the rail pressure and the second energizing time. According to an aspect of this embodiment, the time interval ranges between 50 and 150 μs. An advantage of this embodiment is that the time interval, calibrated as a function of the rail pressure and the second energizing time, is able to keep as stable as possible the control volume pressure.

Another embodiment of the disclosure provides an internal combustion engine of an automotive system, the engine being equipped with a fuel injection system, wherein a method of operating a fuel injector according to any of the previous embodiments is actuated. The method according to one of its aspects can be carried out with the help of a computer program including a program-code for carrying out all the steps of the method described above, and in the form of computer program product including the computer program.

The computer program product can be embedded in a control apparatus for an internal combustion engine, including an Electronic Control Unit (ECU), a data carrier associated to the ECU, and the computer program stored in a data carrier, so that the control apparatus defines the embodiments described in the same way as the method. In this case, when the control apparatus executes the computer program all the steps of the method described above are carried out.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background of the present disclosure or the following detailed description.

Figure 1:
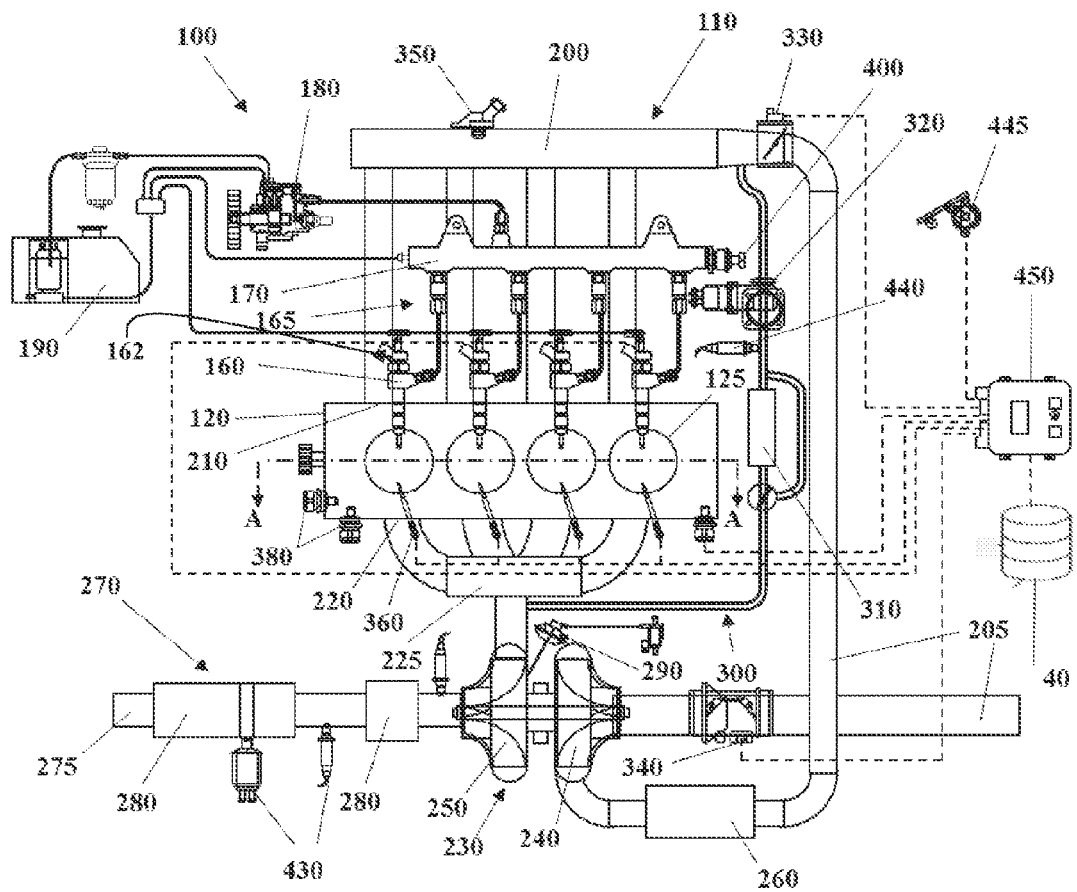
FIG. 1 shows an automotive system.
Figure 2:
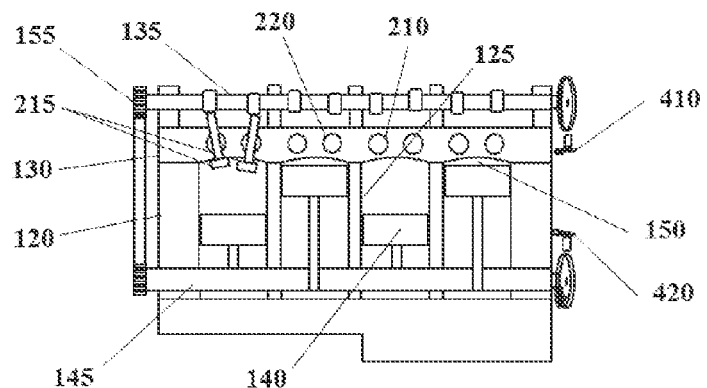
FIG. 2 is a section of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150.

A fuel and air mixture (not shown) is injected into the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increases the pressure of the fuel received from a fuel source 190. The fuel injection system with the above disclosed components is known as common rail Diesel injection system (CR System). It is a relative new injection system for passenger cars. The main advantage of this injection system, compared to others, is that due to the high pressure in the system and the electromagnetically controlled injectors it is possible to inject the correct amounts of fuel at exactly the right moment. This implies lower fuel consumption and less emissions.

Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a fixed geometry turbine 250 including a waste gate 290. In other embodiments, the turbocharger 230 may be a variable geometry turbine (VGT) with a VGT actuator arranged to move the vanes to alter the flow of the exhaust gases through the turbine.

The exhaust system 270 may include an exhaust pipe 275 having one or more exhaust after treatment devices 280. The after treatment devices may be any device configured to change the composition of the exhaust gases. Some examples of after treatment devices 280 include, but are not limited to, catalytic converters (two and three way), oxidation catalysts, lean NOx traps, hydrocarbon adsorbers, selective catalytic reduction (SCR) systems. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110 and equipped with a data carrier 40. The ECU 450 may receive input signals from various sensors configured to generate the signals in proportion to various physical parameters associated with the ICE 110. The sensors include, but are not limited to, a mass airflow, pressure, temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the waste gate actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system and an interface bus. The CPU is configured to execute instructions stored as a program in the memory system, and send and receive signals to/from the interface bus. The memory system may include various storage types including optical storage, magnetic storage, solid-state storage, and other non-volatile memory. The interface bus may be configured to send, receive, and modulate analog and/or digital signals to/from the various sensors and control devices. The program may embody the methods disclosed herein, allowing the CPU to carryout out the steps of such methods and control the ICE 110.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, said carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulated technique such as QPSK for digital data, such that binary data representing said computer program code is impressed on the transitory electromagnetic signal. Such signals are e.g. made use of when transmitting computer program code in a wireless fashion via a WiFi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

Figure 3:
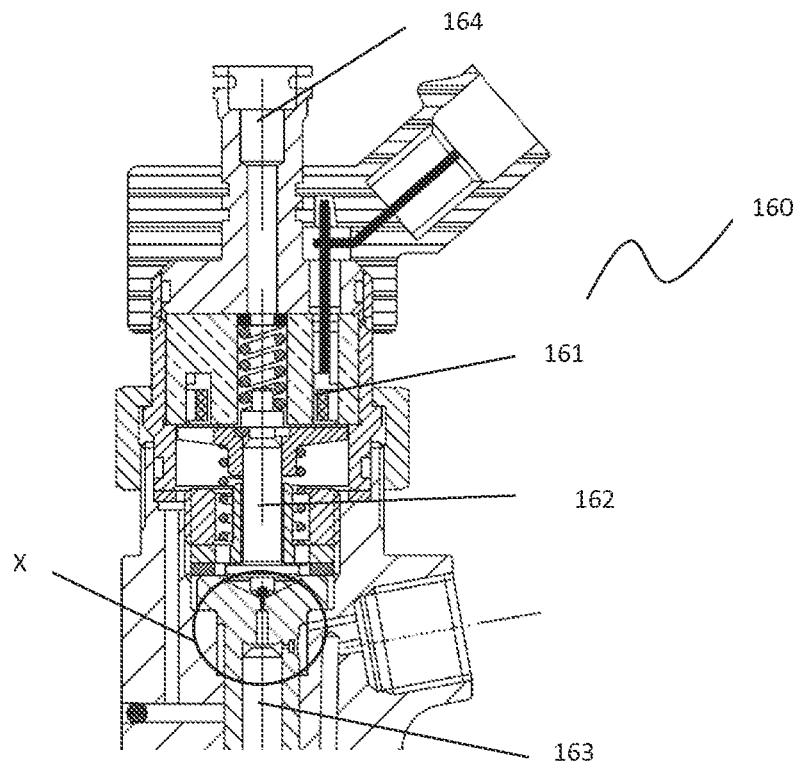
FIG. 3 is a partial section (upper side) of a fuel injector.

FIG. 3 shows a schematic upper section of a fuel injector 160, which includes an injector solenoid 161 controlled by the ECU 450, and an injector actuator 162. As known and not shown, the injector also includes a nozzle, provided with an injector needle 163. As already mentioned, the ECU operates each fuel injection by energizing the injector solenoid. The energizing time (ET) of the fuel injector is determined by the ECU as a function of a desired quantity of fuel to be injected.

Figure 4:
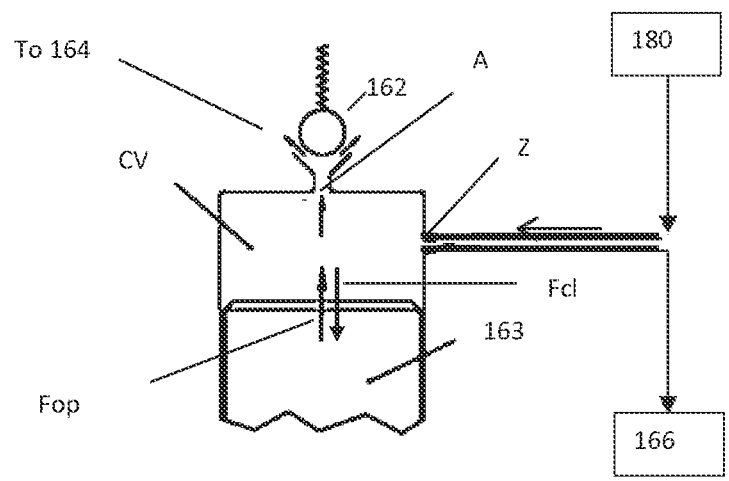
FIG. 4 is a schematic view representing the control volume of a fuel injector and the mechanism of its pressure discharge.

With reference to FIG. 4, when the injector solenoid 161 is energized, the injector actuator 162 rises up and opens the calibrated hole A, so causing the discharge of the injector control volume CV, which is on the injector needle 163. This volume, when the actuator is not energized, has the same pressure of the rail, since it is fed through the calibrated hole Z. As can be appreciated following the arrows in FIG. 4, the fuel coming from the injection pump 180 (and the rail 170) enters the injector 160 according to two paths: a first path towards the injector nozzle 166 (this is the fuel, which is injected in the engine combustion chamber), a second path flows to the injector control volume CV.

When the injector is energized and the control volume opened, the pressure in the control volume is determined by the flow through the hole Z and by the flow through the hole A towards the leakage line 164. As already said, being the diameter of the hole A larger than the diameter of the hole Z, the pressure pCV in the control volume CV will decrease, since more fuel exits the control volume than enters the control volume. The closing force Fcl on the injector needle 163 is determined by the pressure value in the control volume multiplied by the upper sealing area of the injector needle 163. The opening force Fop, acting on the same needle, is determined by the injection pressure acting on the lower sealing area of the injector needle multiplied by the lower sealing area itself (this product can be considered as a constant value in a first approximation). As a consequence, whenever the pressure in the control volume will reach a value, so that Fcl<Fop, the injector needle 163 will start raising and the injection will begin.

A method that will allow the decrease of the injector shot to shot dispersion has to act on the control volume pressure pCV trying to have its value as constant as possible when the fuel injection is actuated, i.e. at the beginning of the energizing electrical current pulse. This is realized, according to an embodiment of the present disclosure, by means of a short pulse of the energizing electrical current, not able to actuate a fuel injection, which is placed just before the injection event to be actuated. In other words, a current pulse is actuated before every current injection. Such pulse is stabilizing the pressure upstream of the injector nozzle and above all the pressure in the injector control volume, thus decreasing the shot to shot deviation of the injector itself.

Figure 5:
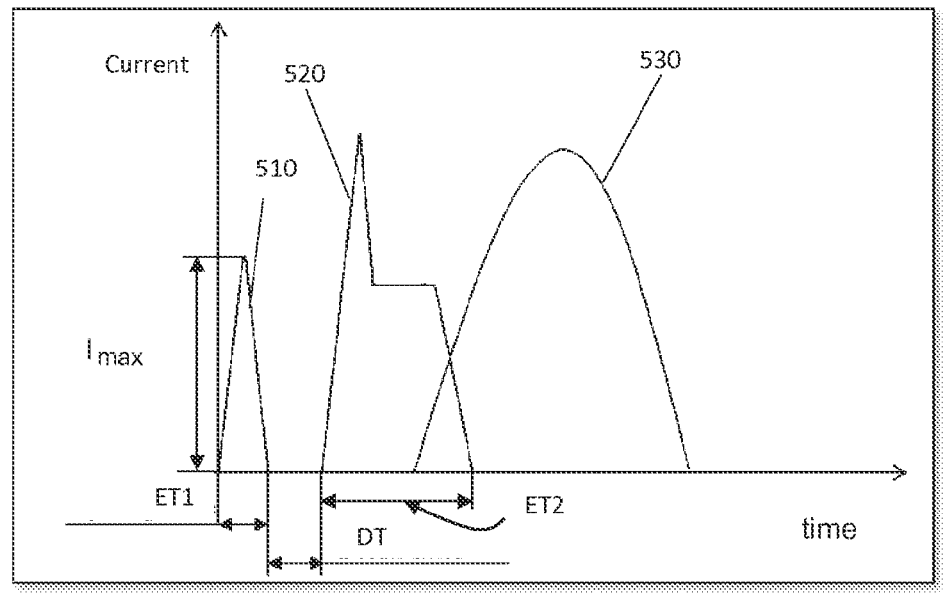
FIG. 5 is a graph depicting a first energizing electrical current followed by a standard second energizing electrical current for actuating a fuel injection.

FIG. 5 is a graph depicting the present strategy. It shows on a time scale a first energizing electrical current 510, without fuel injection actuation, followed by a second energizing electrical current 520 for actuating a fuel injection, whose injection rate is represented by the curve 530. The first energizing electrical current is characterized by a predetermined energizing time ET1 and a current maximum value Imax. The second energizing electrical current will get an energizing time ET2, which is determined by the engine operating point. The first energizing electrical current 510 and the second energizing electrical current 520 are temporarily spaced with a predetermined time interval DT.

Figure 6:
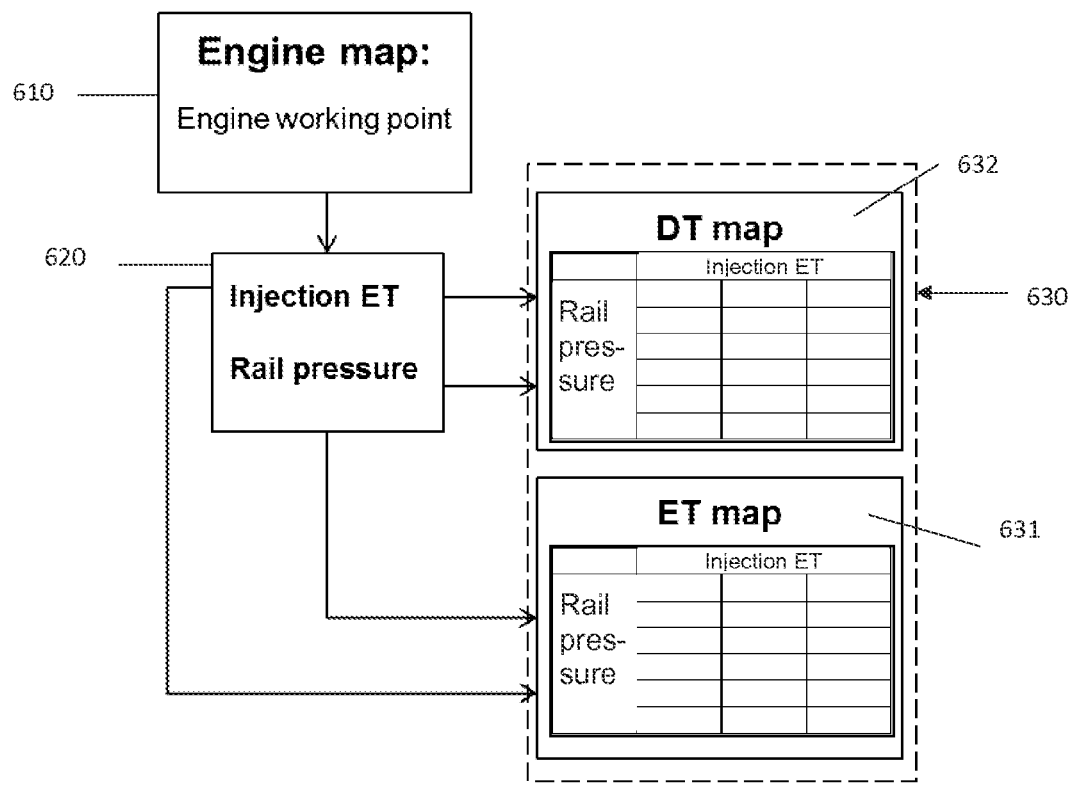
FIG. 6 shows a block diagram of the method according to an embodiment of the present injection.

FIG. 6 shows a block scheme of the method according to an embodiment of the present disclosure. Depending on the engine working point 610, the rail pressure $p_{rail}$ and the fuel injection quantity Q are determined. Then, from a known injector map, the energizing time ET2 is determined as a function of rail pressure $p_{rail}$ and fuel injection quantity Q. The energizing time ET2 and the rail pressure prail constitute block 620 and are used as input parameters for two maps 631, 632 (forming the block 630). Output parameter of these two maps are, respectively, the stabilizing energizing time ET1 and the time interval with respect to the following injection DT.

Figure 7:
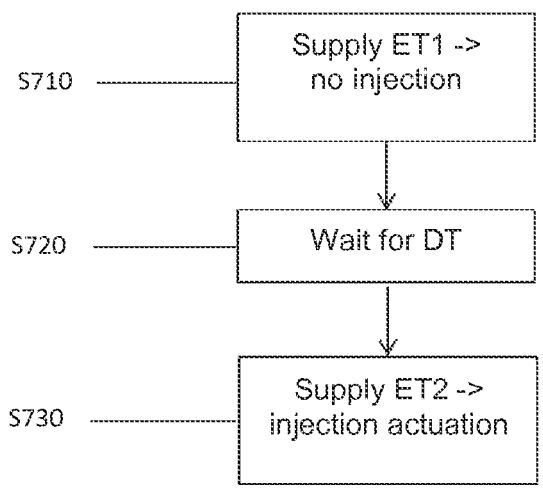
FIG. 7 shows a flowchart of the method according to an embodiment of the present injection.

FIG. 7 shows a flowchart of the method according to an embodiment of the present injection. The method includes the step of supplying S710 a first energizing electrical current 510 to the injector solenoid 161, causing the opening of the injector control volume CV and a pressure reduction in the control volume, since a certain amount of fuel flows towards the leakage line 164. The first energizing electrical current will be actuated for a first energizing time ET1, which is predetermined to avoid that the pressure in the injector control volume CV approximates a value, which would cause the injector needle 163 to raise up, let a fuel injection to start. As said, this first current pulse shall only stabilizes the pressure in the control volume, without performing a fuel injection. Then, after waiting S720 for a predetermined time interval DT, the method includes the step of supplying S730 a second energizing electrical current 520 to the injector solenoid 161, for a predetermined second energizing time ET2, which is a function of a rail pressure $p_{rail}$ and a fuel injection quantity Q, according to the known injector map.

To stabilize the control volume pressure pCV and, at the same time, to avoid the fuel injection, the first energizing electrical current has to be actuated for an energizing time ET1, which should be calibrated as a function of the rail pressure $p_{rail}$ and the second energizing time ET2. As a rule of thumb, the first energizing time ET1 can be smaller than 150 µs. As a consequence, the maximum value Imax of the first energizing electrical current 510 ranges between 4 and 14 Amperes.

Furthermore, to keep as stable as possible the control volume pressure pCV, the time interval DT between first and second energizing electrical current has also to be a function of the rail pressure $p_{rail}$ and the second energizing time ET2. As a rule of thumb, the time interval DT can range between 50 and 150 µs.

Figure 8:
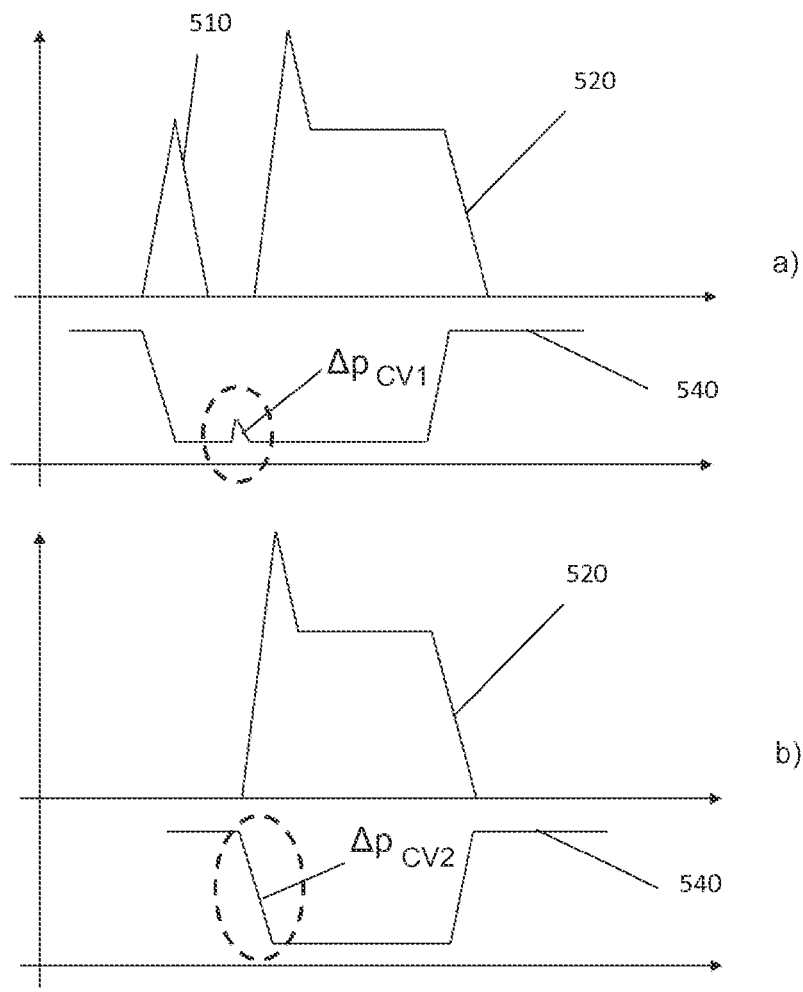
FIG. 8 is a schematic graph, explaining the effect of the first energizing electrical current.

FIG. 8 is a schematic graph, explaining the effect of the first energizing electrical current. In particular, the graph shows the first energizing electric current 510, the second energizing electric current 520 and the pressure behavior 540 in the control volume CV. FIG. 8a is related to the present strategy, with the first current pulse preceding the second current pulse, which actuates the injection, while FIG. 8b is related to a standard strategy, without the first current pulse.

As can be seen, the first energizing electric current 510 opens the control volume and let the control volume pressure reach a value similar to the one, which is seen during the injection: only a small pressure variation $\Delta p_{CV2}$ will occur between the end of the first current pulse and the start of the second current pulse, actuating the injection. This will imply a more stable needle behavior during the injection. Moreover, the portion of the needle lift, which is used to recover the seat material deflection, is not needed anymore (the lower control volume pressure causes the elastic distension of the needle), thus allowing a faster actuation. On the contrary, with a standard injector actuation, the control volume pressure gets a full pressure variation $\Delta p_{CV2}$, which makes the injection less stable.

Experimental tests show that the application of the first current pulse, i.e. the stabilizing current pulse, improves the injector hot to shot stability up to 55% with respect to nominal condition (i.e. without the stabilizing current pulse).

Summarizing the present method allows to obtain remarkable benefits, among others a more stable combustion behavior cycle by cycle, in other words the reduction of the standard deviation of the mean internal pressure. Moreover, the method allows to decrease the minimum fuel injection quantity, that can be calibrated for the engine.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

What is claimed is:

1. A method of operating a fuel injector of an internal combustion engine comprising:
supplying a first energizing electrical current to an injector solenoid for opening an injector control volume and a pressure reduction in said injector control volume for a first energizing time, wherein the first energizing time is predetermined such that that the pressure in the injector control volume is less than a value which would cause an injector needle to raise up and a fuel injection to start; and
supplying a second energizing electrical current to the injector solenoid after a predetermined time interval for a predetermined second energizing time which is a function of a rail pressure and a fuel injection quantity.

2. The method according to claim 1, wherein the first energizing time is a function of the rail pressure ($p_{rail}$) and the second energizing time.

3. The method according to claim 2, wherein the first energizing time is less than 150 $\square$s.

4. The method according to claim 1, wherein a maximum value ($I_{max}$) of the first energizing electrical current is between 4 and 14 A.

5. The method according to claim 1, wherein the predetermined time interval is a function of the rail pressure ($p_{rail}$) and the second energizing time.

6. The method according to claim 5, wherein the predetermined time interval is between 50 and 150 $\square$s.

7. An internal combustion engine of an automotive system comprising a fuel injection system having a fuel injector operated according to the method of claim 1.

8. A computer program comprising a computer-code suitable for performing the method according claim 1, wherein the computer code is stored on a non-transitory computer readable medium.

9. A computer program product comprising a processor executing the computer program according to claim 8.

10. A control apparatus for an internal combustion engine, comprising an Electronic Control Unit, a data carrier associated to the Electronic Control Unit and a computer program according to claim 8 stored in the data carrier.

11. A method of operating a fuel injector of an internal combustion engine comprising:
supplying a needle closing force on a needle of a fuel injector when the fuel injector is not active; and
supplying a needle opening force to inject fuel with the fuel injector, the needle opening force comprising:
supplying a first energizing electrical current to an injector solenoid for opening an injector control volume and a pressure reduction in said injector control volume for a first energizing time, wherein the first energizing time is predetermined such that that the pressure in the injector control volume is less than a value which would cause an injector needle to raise up and a fuel injection to start; and
supplying a second energizing electrical current to the injector solenoid after a predetermined time interval for a predetermined second energizing time which is a function of a rail pressure and a fuel injection quantity, the second energizing time causes the fuel injection to start.

* * * * *